United States Patent [19]

Keevil et al.

[11] Patent Number: 5,376,890

[45] Date of Patent: Dec. 27, 1994

[54] CAPACITIVE DISTANCE MEASURING APPARATUS HAVING LIQUID GROUND CONTACT

[75] Inventors: Michael D. Keevil, Arnold; Brian E. Burgdorf, St. Peters; Paul D. Ketterer, St. Charles; Edwin T. Wood, Jr., Fenton, all of Mo.

[73] Assignee: MEMC Electronic Materials, Inc., St. Peters, Mo.

[21] Appl. No.: 74,915

[22] Filed: Jun. 10, 1993

[51] Int. Cl.$^5$ .............................. G01R 27/26
[52] U.S. Cl. .................. 324/688; 324/662; 324/686; 361/278; 361/280
[58] Field of Search ............... 324/661, 662, 686, 688, 324/690; 361/280, 281, 284, 278

[56] References Cited

U.S. PATENT DOCUMENTS

| | | | |
|---|---|---|---|
| 2,825,978 | 3/1958 | Davis | 324/661 X |
| 3,706,919 | 12/1972 | Abbe | 361/280 |
| 3,775,678 | 11/1973 | Abbe | 324/679 |
| 3,805,150 | 4/1974 | Abbe | 324/662 |
| 3,990,005 | 11/1976 | Abbe et al. | 324/662 |
| 4,970,468 | 11/1990 | Ishizawa et al. | 324/662 |
| 5,136,250 | 8/1992 | Abdelli | 324/661 |

Primary Examiner—Kenneth A. Wieder
Assistant Examiner—Glenn W. Brown
Attorney, Agent, or Firm—Senniger, Powers, Leavitt & Roedel

[57] ABSTRACT

Apparatus for measuring the distance between a surface of a workpiece and a predetermined location of the type which measures the capacitance between the predetermined location and the workpiece surface and determines the distance corresponding to the measured capacitance. The apparatus includes a probe disposed at said predetermined location, the probe may be selectively excited to a known electric potential. A support assembly for supporting the workpiece is mounted on the apparatus for rotation relative to the probe. The support assembly is constructed to support the workpiece for rotation and to maintain the workpiece at a substantially constant electric potential. A grounding mechanism for grounding the support assembly includes a fixed grounding member and a liquid ground contact which engages the support assembly for maintaining electrical contact between the support assembly and the fixed grounding member as the support assembly rotates relative to the fixed grounding member.

15 Claims, 3 Drawing Sheets

CAPACITIVE DISTANCE MEASURING APPARATUS HAVING LIQUID GROUND CONTACT

BACKGROUND OF THE INVENTION

This invention relates generally to apparatus for measuring distance from the capacitance detected between a workpiece and a probe of the apparatus, and more particularly to grounding mechanisms in such apparatus.

Precise measurement of dimensional properties of a workpiece is of particular importance in the field of semiconductor wafer manufacture. The wafer must be held within tightly controlled dimensional specifications to be of the quality necessary for electronics applications. The critical dimensional specifications of the wafer include flatness, bow, warp and total thickness variation. Flatness is a measure of the roughness of one surface (or some smaller region thereof) of the wafer, and is expressed in terms of the sum of the largest positive and negative deviations of the surface from a reference plane. Bow relates to the convexity or concavity of the wafer, and is calculated from measurements taken on opposite sides of the wafer. Warp is the difference between the maximum and minimum distances of the median surface of the wafer and a reference plane, while total thickness variation is the maximum difference in thickness of the wafer.

It is well known in the industry of semiconductor manufacture to use capacitive distance measuring apparatus for accurately determining flatness, bow, warp and total thickness variation. Generally speaking such an apparatus includes a chuck which holds the wafer and is mounted on a shaft assembly for rotation, and for movement laterally and up and down. Probes are located at positions spaced from both the bottom and top sides of the wafer held on the chuck. The probes are capable of being excited to known electric potentials and act as one half of a capacitor, with adjacent surfaces of the wafer acting as the other half. Examples of probes and operating circuitry therefor are disclosed in U.S. Pat. Nos. 3,706,919, 3,775,678, 3,805,150 and 3,990,005, the disclosures of which are incorporated herein by reference.

Capacitive distance measuring requires that the wafer and the chuck be maintained at known potentials. Instantaneous fluctuations in voltage of the wafer or chuck will cause deviations in the measured capacitance so as to give a false distance reading. The wafer can be grounded (i.e., maintained at a "zero" potential), or electrically isolated so that its electric potential cannot change. The chuck is maintained at a constant potential by grounding. Grounding the chuck requires an electrical connection to be maintained between a stationary ground (i.e., a nearby portion of the apparatus) and the chuck or the shaft, as the chuck and shaft rotate. Presently existing ground contact mechanisms between the chuck or shaft assembly and the stationary ground employ solid electrical conductors spring biased into engagement with some portion of the shaft assembly. However in operation of the apparatus, momentary disconnections of the chuck from the stationary ground still occur causing voltage fluctuations in the chuck and false distance readings to be indicated by the apparatus.

SUMMARY OF THE INVENTION

Among the several objects and features of the invention may be noted the provision of a capacitive measuring apparatus which consistently gives accurate distance measurements; the provision of such an apparatus which maintains constant electrical potential of the workpiece and chuck supporting the workpiece; the provision of such an apparatus in which a constant ground connection is maintained between the rotating chuck and a stationary ground; the provision of such an apparatus in which the ground connection is not substantially worn by the frictional interaction between the chuck and the ground connection; the provision of such an apparatus in which the ground connection is economical to manufacture.

Still further among the several objects and features of the present invention may be noted the provision of a method for modifying existing distance measuring apparatus which is easy to carry out and involves minimal change to the original design; the provision of such a method which produces a better ground for the chuck in the apparatus than the grounding mechanisms in the original apparatus.

Apparatus constructed according to the principles of the present invention measures the distance between a surface of a workpiece and a predetermined location. More specifically, the apparatus is of the type which measures the capacitance between the predetermined location and the workpiece surface and determines the distance corresponding to the measured capacitance. Generally, the apparatus comprises a probe disposed at said predetermined location, the probe being adapted for selective excitation to a known electric potential. Means for supporting the workpiece is mounted on the apparatus for rotation relative to the probe. The support means is constructed to support the workpiece for rotation therewith and to maintain the workpiece at a substantially constant electric potential. Means for grounding the support means comprises a fixed grounding member and a liquid ground contact engaging the support means for maintaining electrical contact between the support means and the fixed grounding member as the support means rotates relative to the fixed grounding member.

The method of the present invention is applied to an apparatus having probes, support means and a fixed ground member as described above, and a fixed housing assembly containing at least a portion of the support means. The method generally involves removing the fixed ground member from the fixed housing assembly, and filling a recess in the ground member with an electrically conductive liquid. The ground member is then located in the fixed housing such that a portion of the support means is immersed in the liquid in the recess.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 4:
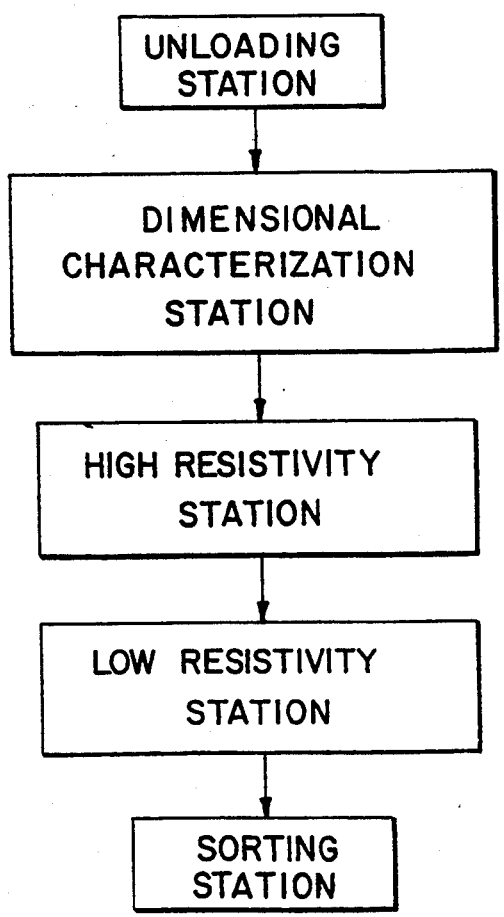
FIG. 4 is a flow chart illustrating operation of a wafer characterization machine of the type in which the apparatus of the present invention is commonly employed.

Referring now to the drawings, and in particular to FIG. 4, a flow chart illustrating the operation of a silicon wafer characterization machine is shown to include an unloading station, a dimensional characterization station, high and low resistivity stations and a sorting station. The general construction and operation of wafer characterization machines is well known to those of ordinary skill in the art, and will not be described in detail herein. An example of such a machine which is commercially available is the 7200 WaferCheck® wafer characterization system manufactured by ADE Corporation of Newton, Mass. As shown in FIG. 4, wafers loaded into the machine are first unloaded and fed to a dimensional characterization station at which dimensional characteristics including bow, warp, flatness and total thickness variation are measured using a capacitive distance measuring apparatus to be described more fully below. Each wafer is delivered sequentially from the dimensional characterization station by a conveyor (not shown) to the high and low resistivity stations where electrical characteristics of the wafer are measured. Finally, the wafer is sorted by the machine according to the dimensional and electrical characteristics detected.

Figure 1:
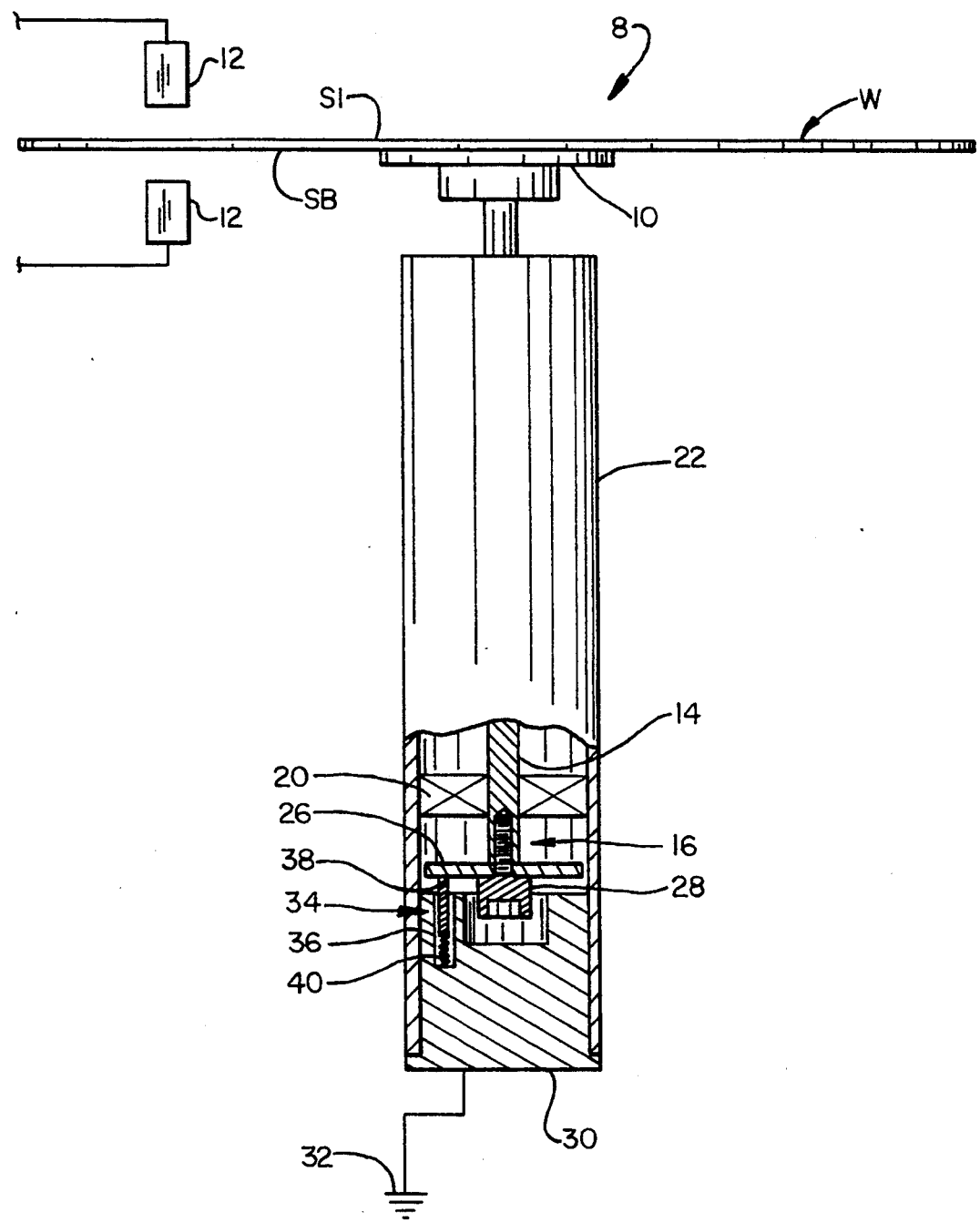
FIG. 1 is a schematic cross section of capacitive distance measuring apparatus having a prior art grounding mechanism.

A conventional arrangement of the capacitive distance measuring apparatus 8 is schematically shown in FIG. 1. A generally circular wafer W is supported by a chuck 10. A pair of probes 12 are disposed at predetermined locations on respective opposite sides of the wafer. The probes 12 are of the capacitive type connected to a power source and circuitry (not shown) which selectively excites the probes to known electrical potentials for the purpose of detecting the capacitance between the tips of the probes and the nearest surface (designated ST and SB) of the wafer W. Capacitance is generally inversely proportional to the distance separating the "plates" of the capacitor. Thus, the distance from each probe 12 an adjacent wafer surface (ST, SB) can be very accurately found from the indicated capacitance. In operation at the dimensional characterization station, the chuck 10 and wafer W are first moved up off of the conveyor (not shown) which transports the wafer from station to station. The wafer W is then rotated and moved laterally with respect to the probes 12 so that substantially all of its top and bottom surfaces ST, SB are examined. The manner in which dimensional characteristics such as bow, warp, flatness and total thickness variation are found using the capacitive probes 12 is well known and will not be described in this application. It is to be understood that the types of measurements which are made by the apparatus 8 are examples and not intended to limit the types of wafer characterization which may be carried out by the apparatus.

The chuck 10 supporting the wafer W is covered with an electrically insulating material (not shown) to prevent any current flow to or from the wafer. The chuck 10 is attached to the upper end of a shaft 14 of a shaft assembly indicated generally at 16. The chuck 10 and shaft assembly 16 constitute "support means" in the preferred embodiment of the invention. The shaft 14 is supported by bearings 20 (only one is shown) in a tubular housing 22 for rotation about the longitudinal axis of the shaft, and a stepper motor (not shown) is operable to selectively rotate the chuck 10 and shaft. The housing 22 is mounted in a "Z" cartridge (not shown) and is capable of precisely controlled movement up and down within the cartridge. The Z cartridge is supported for movement laterally. Thus, the wafer W may be rotated and moved horizontally and laterally during the dimensional characterization process carried out at the dimensional characterization station.

The shaft assembly 16 also includes a stainless steel ground washer 26 mounted on the lower end of the shaft 14 by a socket-head bolt 28. The ground washer 26 is in electrical contact with the shaft 14 and chuck 10. An end cap 30 (broadly, "fixed ground member") is secured in the lower end of the tubular housing 22 and closes the lower end of the housing. The end cap 30 is connected to electrical ground 32 as schematically illustrated in FIG. 1. A ground contact mechanism, indicated generally at 34, electrically connects the ground washer (and hence the shaft 14 and chuck 10) to the end cap. The ground contact mechanism 34 is received in an upwardly opening bore 36 in the end cap 30. The ground contact mechanism 34 includes a brass pin 38 which is spring biased into engagement with the ground washer by a coil spring 40 in the bore 36. The pin 38 is free of any fixed connection to the washer 26 and permits the washer (and shaft 14) to rotate relative to the pin while maintaining engagement. As stated above, this known ground contact mechanism 34 has not been successful in consistently maintaining a grounding contact between the shaft 14 and the end cap 30. As a result instantaneous voltages in the chuck 10 causing an error in the readout of the capacitive probes 12 continue to occur.

Figure 2:
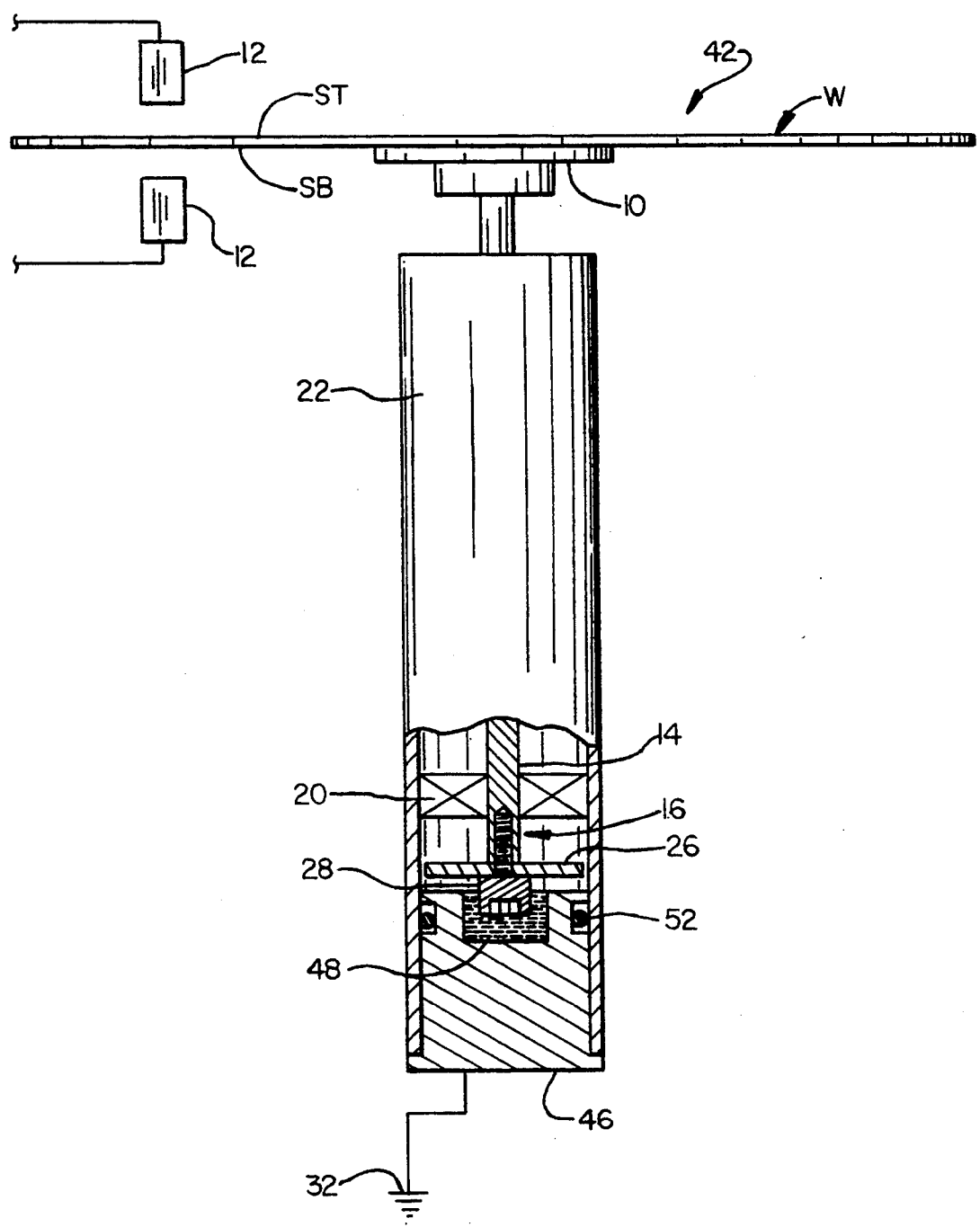
FIG. 2 is a schematic cross section of capacative distance measuring apparatus having a grounding mechanism of the present invention.

Apparatus for measuring the distance between a fixed location and the surfaces ST, SB of the wafer W constructed according to the principles of the present invention is indicated generally at 42 in FIG. 2. The construction and arrangement of the probes 12, chuck 10, shaft 14, housing 22 and bearings 20 are substantially the same as the prior art. However, the ground contact mechanism 34 and end cap 30 have been replaced by a liquid ground contact (indicated generally at 44) and end cap 46 of the present invention.

Figure 3:
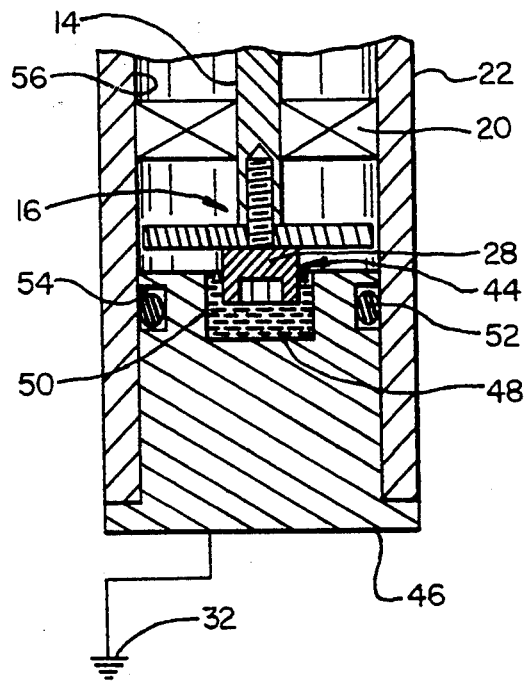
FIG. 3 is an enlarged fragmentary view of the grounding mechanism.

As shown in FIG. 3, the liquid ground contact 44 includes a quantity of electrically conductive liquid 48 held in an upwardly opening recess 50 (broadly "containment means") formed by boring in the upper end of the end cap 46. In the preferred embodiment, the liquid 48 is mercury, selected in part for its high electrical conductivity. In addition, mercury is desirable because it does not attack the metal components of the apparatus 42 with which it comes into contact. Further, mercury provides very little resistance to movement so that the moving components of the apparatus 42 in contact with the mercury are not subject to wear. An O-ring 52 located in an annular groove 54 in the end cap 46 seals with the interior wall 56 of the housing 22 to prevent mercury from leaking out the bottom of the housing.

The socket-headed bolt 28 (broadly, the "grounding contact") which secures the ground washer 26 on the shaft 14 projects downwardly from the lower end of the shaft into the recess 50 where it is partially immersed in the mercury 48. Although the shaft 14 and bolt 28 rotate relative to the end cap 46 and mercury 48 held in the recess 50, the bolt and the mercury always remain in contact with each other thereby providing an uninterrupted electrical path between the shaft 14 and ground 32. Although the ground washer 26 is not used to ground the chuck 10 in the apparatus 42, it may be left on the shaft to operate as a shield to prevent mercury from splashing upwardly beyond the shield. However, it is also envisioned that the ground washer 26 could be replaced by a lightweight plastic shield (not shown).

Presently existing capacitive distance measuring apparatus may be readily modified according to the method of the present invention. The end cap 30 of the prior art apparatus 8 (FIG. 1) can be removed from the housing 22 and the brass pin 38 and spring 40 removed from the bore 36 in the end cap. The end cap 30 is then formed with the annular groove 54 to receive the O-ring 52. The recess 50 in the upper end of the end cap is filled with mercury 48 and the end cap (now as shown in FIG. 2 as 46) is reinserted into the housing 22 with the head of the bolt 28 being received in the recess and partially immersed in the mercury. The apparatus 42 is ready for operation after the end cap 46 is re-secured to the housing 22.

Thus it may be seen that the several objects and features of the present invention are achieved in the distance measuring apparatus disclosed herein. It has been found since the old ground contact mechanism 34 was replaced with the liquid ground contact 44 that erroneous dimensional characterization readings of the apparatus 8 due to electric potential changes in the chuck 10 have been eliminated. More consistently accurate dimensional characterization of the wafers W is being achieved than ever before. The partial immersion of a portion of the shaft assembly 16 (the bolt head 28) in the mercury 48 in the end cap recess 50 maintains a constant electrical connection of the chuck 10 to ground 32 notwithstanding rotation of the shaft assembly relative to the end cap 46 and mercury. In this way a constant (zero) electrical potential of the chuck 10 supporting the wafer is maintained. Moreover, the frictional interaction of the bolt 28 and the mercury 48 is minimal so that there is no substantial wear on the bolt or any other part of the ground contact 44. The liquid ground contact 44 of the apparatus 42 may be easily formed on existing equipment without substantial modification, and is therefore economical to manufacture.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for measuring the distance between a surface of a workpiece and a predetermined location, the apparatus being of the type which measures the capacitance between the predetermined location and the workpiece surface and determines the distance corresponding to the measured capacitance, the apparatus comprising:

a probe disposed at said predetermined location, the probe being adapted for selective excitation to a known electric potential;

means for supporting the workpiece, said support means being mounted on the apparatus for rotation relative to the probe, said support means being constructed to support the workpiece for rotation therewith and to maintain the workpiece at a substantially constant electric potential;

means for grounding said support means comprising a fixed grounding member and a liquid ground contact engaging said support means for maintaining electrical contact between said support means and the fixed grounding member as said support means rotates relative to the fixed grounding member.

2. Apparatus as set forth in claim 1 wherein said liquid ground contact comprises a quantity of electrically conductive liquid and containment means for holding the quantity of liquid, a portion of said support means projecting into said containment means and being at least partially immersed in said quantity of liquid as said portion of said support means moves relative to said containment means.

3. Apparatus as set forth in claim 2 wherein said containment means comprises an outwardly opening recess formed in the fixed grounding member.

4. Apparatus as set forth in claim 3 wherein the recess is upwardly opening and is formed by boring into an upper end of the fixed grounding member.

5. Apparatus as set forth in claim 3 further comprising a housing in which at least a portion of said support means is disposed, and wherein the fixed ground member includes means for sealing with the housing to prevent escape of liquid from the housing.

6. Apparatus as set forth in claim 3 wherein said support means comprises a shaft assembly mounted on the apparatus for rotation about its longitudinal axis, and a chuck mounted on the shaft assembly for rotation therewith, the chuck being constructed for supporting the workpiece in the apparatus, a portion of the shaft assembly being disposed in the recess in the fixed grounding member and at least partially immersed in the quantity of liquid.

7. Apparatus as set forth in claim 6 wherein the shaft assembly comprises a shaft and a grounding contact extending outwardly from one end of the shaft and into the quantity of liquid in the recess.

8. Apparatus as set forth in claim 3 wherein the liquid is mercury.

9. In an apparatus for measuring the distance between a surface of a wafer made of semiconductor material and a predetermined location of the type having a probe adapted for selective excitation to a known electric potential, a chuck for supporting the wafer, the chuck being mounted on a shaft assembly for rotation of the shaft assembly, chuck and wafer relative to the probe, the chuck and the shaft assembly being constructed to support the wafer for rotation therewith and to maintain the wafer at a substantially constant electric potential, the apparatus being operable to rotate the wafer and to detect the capacitance between the probe and the wafer surface and determine the distance between the wafer surface and the predetermined location corresponding to the measured capacitance, wherein the improvement comprises:

means for grounding the shaft assembly comprising a fixed grounding member and a liquid ground contact engaging the shaft assembly for maintaining electrical contact between the shaft assembly and the fixed grounding member as the shaft assembly rotates relative to the fixed grounding member.

10. Apparatus as set forth in claim 9 wherein said liquid ground contact comprises a quantity of electrically conductive liquid and containment means for holding the quantity of liquid, a portion of the shaft assembly projecting into said containment means and being at least partially immersed in said quantity of liquid as said portion of the shaft assembly moves relative to said containment means.

11. Apparatus as set forth in claim 10 wherein said containment means comprises an outwardly opening recess formed in the fixed grounding member.

12. Apparatus as set forth in claim 11 wherein the recess is upwardly opening and is formed by boring into an upper end of the fixed grounding member.

13. Apparatus as set forth in claim 11 further comprising a housing in which at least a portion of the shaft assembly is disposed, and wherein the fixed ground member includes means for sealing with the housing to prevent escape of liquid from the housing.

14. A method for modifying an existing apparatus for measuring the distance between a surface of a wafer made of semiconductor material and a predetermined location, the apparatus being of the type having at least one probe adapted for selective excitation to a known electric potential, a chuck for supporting the wafer attached to a shaft assembly mounted for rotation by bearings in a fixed housing assembly for rotation of the shaft assembly, chuck and wafer relative to the probe, the chuck and shaft assembly being constructed to maintain the wafer at a substantially constant electric potential, and a solid ground contact mounted on a fixed ground member of the fixed housing assembly and in sliding engagement with the shaft assembly, the apparatus being operable to rotate the wafer and to detect the capacitance between the probe and the wafer surface and determine the distance between the wafer surface and the predetermined location corresponding to the measured capacitance, the method comprising the steps of:

removing the fixed ground member from the fixed housing assembly;

filling a recess in the fixed ground member with an electrically conductive liquid;

locating the fixed ground member in the fixed housing assembly such that a portion of the shaft assembly is immersed in the liquid in the recess.

15. The method of claim 14 further comprising the steps of forming a groove in the fixed ground member and inserting a seal therein whereby upon location of the fixed ground member in the fixed housing assembly the fixed ground member seals with the fjord housing assembly to hold the electrically conductive liquid in the fixed housing assembly.

* * * * *